United States Patent

Lavender

[15] 3,684,316

[45] Aug. 15, 1972

[54] ROTARY JOINT

[72] Inventor: William James Lavender, Edmonton, Alberta, Canada

[73] Assignee: Sherritt Gordon Mines Limited, Toronto, Ontario, Canada

[22] Filed: Sept. 18, 1970

[21] Appl. No.: 73,410

[52] U.S. Cl. .....................285/16, 285/134, 285/190
[51] Int. Cl................................................F16l 39/04
[58] Field of Search........285/134, 190, 136, 135, 16, 285/15

[56] References Cited

UNITED STATES PATENTS

| | | | |
|---|---|---|---|
| 1,202,966 | 10/1916 | Carroll | 285/134 X |
| 3,096,103 | 7/1963 | Murphy | 285/134 |
| 836,989 | 11/1906 | Oliver | 285/190 |
| 2,450,895 | 10/1948 | Keim | 285/134 |
| 3,166,344 | 1/1965 | Davis | 285/134 |
| 3,517,694 | 6/1970 | Lieffring | 285/134 X |

FOREIGN PATENTS OR APPLICATIONS

| | | | |
|---|---|---|---|
| 1,567,810 | 4/1969 | France | 285/190 |
| 493,452 | 10/1938 | Great Britain | 285/134 |

*Primary Examiner*—Thomas F. Callaghan
*Attorney*—Frank I. Piper, Arne I. Fors and James T. Wilbur

[57] ABSTRACT

A rotary joint for transferring fluids from stationary pipes to rotating pipes. The joint has a non-rotatable housing with an elongated cylindrical opening within which rotate inner and outer concentric pipes. The pipes have open ends within the housing. The open end of the inner pipe projects beyond the open end of the outer pipe. A gland is mounted about the outer pipe and a second gland is mounted about the inner pipe beyond the end of the outer pipe. Both glands are within the housing and seal the pipes to the inside wall of the opening. The housing has two channels, one of which is located between the two glands and extending laterally of the opening outwardly for the discharge of liquid from the outer pipe and the other of which commencing at the free end of the inner pipe and extending longitudinally of the opening for the discharge of fluid from the inner pipe.

3 Claims, 3 Drawing Figures

PATENTED AUG 15 1972 3,684,316

INVENTOR.
WILLIAM J. LAVENDER
BY

ROTARY JOINT

This invention relates to rotary joints and more particularly to joints interconnecting stationary and rotating conduits for transferring fluid media therebetween.

Commonly, fluids flowing into or out of rotating apparatus pass through rotary joints which connect stationary conduits of the apparatus with revolving conduits. Typical of such rotating apparatus is a calcine cooler which consists of an upwardly inclined trough and a screw conveyor mounted longitudinally therein. Hot calcine from a roasting operation is fed into the lower end. As the conveyor rotates, the calcine is carried upwardly to the upper end of the trough on the flights of the conveyor. The flights are hollow and carry cooling media which generally travel countercurrently to the direction of travel of the calcine Rotary joints are also used to feed fluids to flaking rolls, drying kilns and autoclaves and withdrawing the fluids therefrom.

Fluid passing to and from rotary apparatus conventionally travels in two pipes. One pipe is disposed within the other and is concentric therewith. Fluid flows in one direction in the space between the outer wall of the inner pipe and the inner wall of the outer pipe and the fluid flows in the opposite direction through the inner pipe. The ends of the pipes opposite the rotating apparatus are rotatably mounted to a rotary joint. Two fixed conduits are also connected to the rotary joint, each fixed conduit being in fluid flow communication with each rotating pipe for the flow of liquid therethrough. The rotating central pipe and the fixed conduit in communication therewith are mounted coaxially, the open end of the central pipe opening directly into the open end of the fixed conduit. The rotating outer pipe terminates in an annular chamber which surrounds the inner pipe. The other fixed conduit extends generally radially outward from the annular chamber.

The rotating ends of the pipe within conventional rotary joints usually rotate upon incompressible graphite rings. In order to ensure minimum leakage of liquid by the rings, the surfaces of the pipes in contact with the rings must be polished to a mirror finish. Such joints are quite effective where the liquid carried in the pipes carries no solid particles. Where, however, the pipes carry solid-laden liquids such as slurries and suspensions, the solids tend to collect on the mirror surface of the pipes and severely impair the effect of the graphite rings. Consequently, the fluid passing through the joint must be shut off periodically and the joint dismantled so that the surfaces in contact with the seals may be polished. Moreover the seals of joints must be replaced frequently where the fluids passing through the joint carry relatively large amounts of solid particles.

It is accordingly an object of the present invention to provide a rotary joint having seals of which the effectiveness does not depend upon the smoothness of the rotating surfaces in contact therewith. Solid laden liquids such as slurries may pass through the joint without diminishing its usefulness.

It is another object to provide a rotary joint having seals which may be easily adjusted or replaced while liquid is flowing through the pipes.

Another object is to provide a rotary joint using inexpensive and readily available packings as a sealing medium.

These and other objects may be accomplished by providing a rotary joint including: a housing having a cylindrical opening which defines an elongated continuous passage adapted to accommodate an outer rotating pipe and an inner rotating pipe positioned within the outer pipe, the outer pipe having an open end positioned within the housing and the inner pipe extending beyond the end of the outer pipe within the housing and terminating at an open end, the housing having first and second conduits in fluid flow communication with the open ends of the inner and outer pipes respectively, a pair of spaced apart annular packing glands contacting the housing, one gland being disposed about and adjacent the outer pipe and the other gland being disposed about and adjacent the inner pipe; and means for compressing each gland into engagement with the housing and the respective pipe about which the gland is mounted in order to seal the gland thereto.

The invention may be more fully understood with reference to the drawing, in which.

Figure 1:
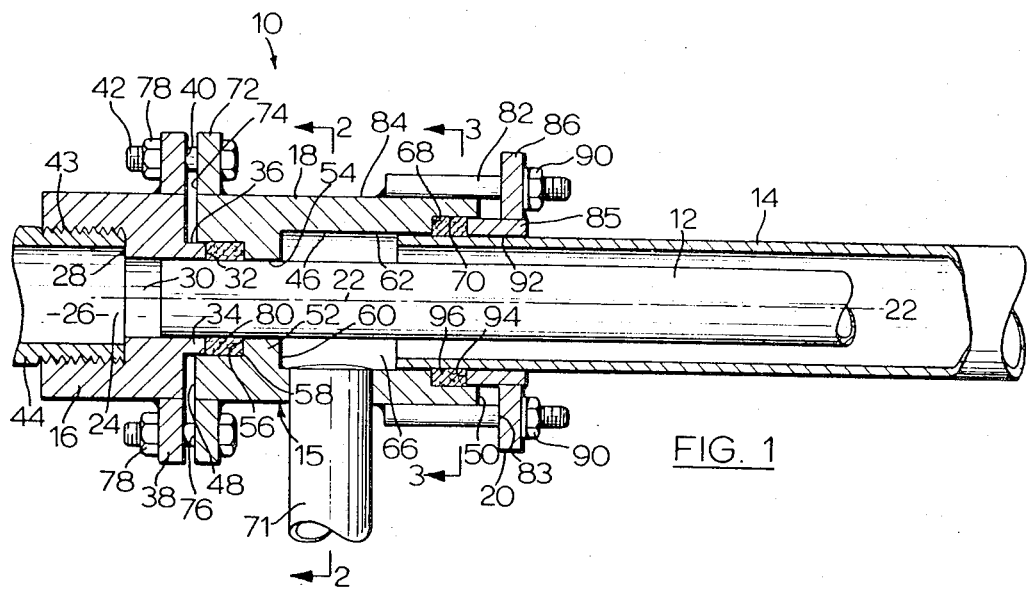
FIG. 1 is a side view of the rotary joint partly in section.
Figure 2:
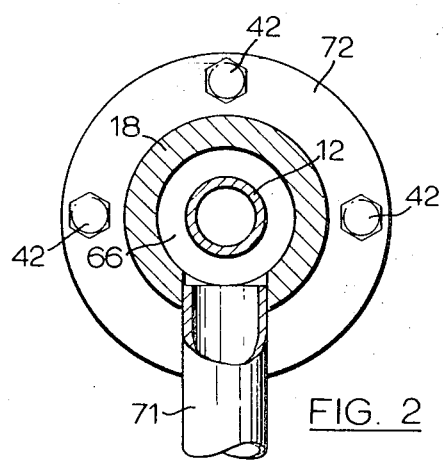
FIG. 2 is a section on line 2—2 of FIG. 1.
Figure 3:
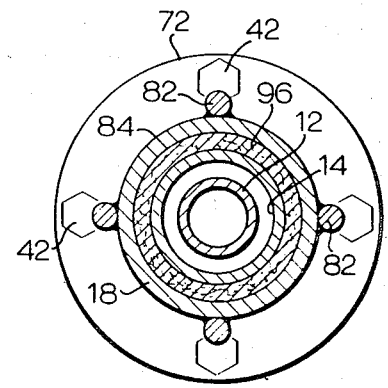
FIG. 3 is a sectional view on line 3—3 of FIG. 1.

With reference to the drawing, the rotary joint according to the invention is indicated generally by the numeral 10. The joint is shown in conjunction with an inner pipe 12 and an outer pipe 14 disposed concentrically about the inner pipe. A conventional drive means not illustrated is provided for rotating the pipes together.

Rotary joint 10 is composed of a housing 15 comprising three separate elements, a terminal member 16, an intermediate member 18 and a compressing member 20. The three elements are disposed along a common axis 22—22. Terminal member 16 is formed with a cylindrical axially extending opening 24 which commences at an enlarged end portion 26 and extends to a cross axially extending shoulder 28. The opening decreases in cross-section at attenuated portion 30 and terminates at an annular cross axially extending wall 32. Member 16 is formed with an annular protrusion 34 which is defined at the end by wall 32 and at the side by outer wall 36 which extends parallel to axis 22—22. A circular flange 38 is formed about the outer wall of member 16. A number of holes 40 are formed in the flange for receipt of bolts 42.

The inner wall of end portion 26 has threads formed therein which mate with the externally threaded outer wall 43 of stationary conduit 44 thereby sealing the conduit to member 16.

The end of inner pipe 12 is somewhat smaller than attenuated portion 30 of opening 24 and is slidably accommodated therein. Where pipe 12 carries discharge liquid from the rotary apparatus, the liquid issues from the end of pipe 12, flows through attenuated portion 30 and into conduit 44.

Formed within intermediate member 18 is a cylindrical axially extending opening 46 which commences at end wall 48 of the member and terminates at end wall 50. An annular ridge 52 extends into the opening and has a cylindrical surface 54 disposed about the outer surface of pipe 12. A cross axial wall 56 extends radially outward from one edge of surface 54 and defines one wall of an annular recess 58 adapted to accommodate annular protrusion 34 of terminal member 16.

Circular ridge 52 terminates at wall 60 which is parallel to wall 56. Wall 60 extends radially outward from surface 54 and terminates at a cylindrical wall 62. Pipe 14 is slidable within the opening defined by wall 62 and is free to rotate therein. Wall 60 and the portion of walls 62 beyond the end of pipe 14 define an annular chamber 66 into which discharges liquid flowing in the passage defined by the inner wall and outer wall of pipe 14 and 12 respectively. Cylindrical wall 62 terminates at a cross-axially outwardly extending wall 68 and a cylindrical wall 70, concentric with pipes 12 and 14 extend between walls 50 and 68.

A conduit 71 extends outwardly from annular chamber 66. The conduit is stationary and carries liquid therethrough. Where conduit 14 carries discharge liquid from the rotary apparatus, the liquid will discharge from the end of pipe 14 into annular chamber 66 and will flow outwardly through conduit 70.

A circular flange 72 is mounted to the outside of member 18 and has a wall 74 coplanar with end wall 48 of the member. The flange has a number of spaced apart apertures 76 formed therein, the position of the apertures corresponding to the apertures in flange 38 whereby bolts 42 may be passed through the apertures in both flanges. Nuts 78 maintain the bolt in position in the apertures.

An annular packing gland 80 is contained within recess 58. The gland is contacted at the side by opposed walls 32 and 56 of members 16 and 18 respectively. By tightening nuts 78, the distance between flanges 38 and 72 will decrease thereby decreasing the distance between opposed surfaces 32 and 56 whereby a compressive force is applied to gland 80. As the gland compresses longitudinally, it will expand laterally, thereby contacting the outer wall of pipe 12 and the cylindrical wall of recess 58 thereby effectively preventing liquid from passing through the recess while allowing pipe 12 to rotate freely within intermediate member 18. The cross sectional area of the outer wall of protrusion 34 is only slightly less than the corresponding area of recess 58 so that as pipe 12 rotates, lateral movement of member 16 and 18 relative to each other is minimized.

A number of threaded studs 82 are spaced about the outer cylindrical wall 84 of member 18. The threaded ends of the studs project beyond end wall 50 of the member.

Compressing member 20 comprises a sleeve 85 mounted about the outside wall of pipe 14 and a circular flange 86 mounted to the outer wall of the sleeve. Flange 86 extends radially outward from axis 22—22 and has a number of spaced apart apertures 83 formed therein, the location of these apertures being such that studs 82 may be inserted therein. Nuts 90 serve to retain studs 82 in the apertures.

Inner wall 92 of sleeve 85 is cylindrical and terminates at the edge adjacent member 18 in a radially outwardly extending surface 94.

An annular packing gland 96 is contained within the recess defined by surfaces 68 and 70 of member 18 and surface 94 of member 20. The gland is contacted at the sides by opposed surfaces 68 and 94. Tightening of nuts 90 will serve to decrease the distance between members 18 and 20 and between opposed surfaces 68 and 94 thereby applying a compressive force to gland 96. As the gland compresses longitudinally, it expands laterally thereby contacting the outer wall of pipe 14 and the inner wall 70 thereby effectively preventing liquid from leaking through the recess.

Glands 58 and 96 are formed of slightly compressible material such as asbestos rope, oil soaked cotton, teflon or graphite. Members 16, 18 and 20 of the housing may be formed of cast iron, mild steel, carbon steel or other material having sufficient mechanical strength. In most applications, the members need not be machined since the pipes are rotating at relatively low speeds, e.g. below 100 r.p.m. If, however, the pipes are rotating at high speeds, the members must be machined.

The joint is assembled by inserting the end portions of the pipes through the cylindrical opening in compressing member 20 and the end portion of inner pipe 12 through the cylindrical openings in members 16 and 18. Member 16 is then turned onto the threaded end of conduit 44. To minimize leakage at the joint, a sealing compound may be applied to the threaded end 43 of conduit 44 before member 16 is turned onto the end. Intermediate member 18 is separated from member 16 and the material forming gland 80 is wrapped about the portion of pipe 12 adjacent wall 32 of member 16. Wall 58 of member 18 is then moved into contact with gland 80 and bolts 42 are passed through registering apertures in flanges 38 and 72 in order to secure members 16 and 18 together. Compressing member 20 is separated from member 18 to permit the material forming gland 96 to be wrapped about outer pipe 14 adjacent the end of member 18. As the gland must be moved laterally beneath projecting end of member 18, the gland material should be somewhat loosely wrapped. Compressing member 20 is then moved toward member 18 and studs 82 inserted into the apertures in flange 86. Nuts 90 are then tightened in order to move gland 96 into the recess and into contact with wall 68 of member 82. Conduit 71 is then connected to intermediate member in any suitable manner, e.g. by welding, by threaded connection.

Compressing member 20 is free to move longitudinally toward and away from member 18 upon tightening and loosening nuts 90. Thus the compressive force applied to gland 96 may be suitably adjusted. Preferably either conduit 44 or 71 is formed of flexible material such as rubber or braided copper so that either member 16 or 18 is also free to move longitudinally with respect to the other member whereby the compressive force applied to gland 80 may be adjusted. As previously indicated, the glands may be adjusted or replaced while liquid is flowing through the pipes. Of course, in order that the glands may be replaced when liquid is flowing through pipes 12 and 14, conduits 44 or 71 must be flexible so that member 16 or member 18 may be moved longitudinally sufficiently to permit access to the glands. Flexibility may be achieved by use of plastic material such as rubber or braided copper, as previously mentioned, and by use of pipe of sufficient length. If neither conduit 44 nor conduit 71 is flexible and it is desired to adjust the compressive force on gland 58, conduit 44 may be rotated. Since conduit 71 maintains intermediate member 18 stationary, member 16 will move longitudinally upon rotation of the conduit.

What I claim as new and desire to protect by Letters Patent of the United States is:

1. In combination: inner and outer axially aligned and concentric rotating pipes; a pair of non-concentric, non rotating pipes, and a rotary joint including: a housing having a compressing member, a terminal member and an intermediate member positioned between said compressing and terminal members, said members each having a cylindrical opening and being positioned side by side one another such that said openings are coaxial with one another and with the axis of said rotating pipes, said openings together defining an elongated continuous passage adapted to accommodate said rotating pipes, said outer pipe having an open end positioned within said housing and said inner pipe extending beyond the end of said outer pipe within said housing and terminating at an open end, the opening of said compressing member and a portion of the opening of said intermediate member adapted to receive said outer rotating pipe, one of said non-rotating pipes extending outwardly from the opening formed in said terminal member, said intermediate member having a pair of spaced apart cylindrical surfaces which define, in part, the opening formed therein, the other said non-rotating pipe commencing at the portion of the opening between said spaced apart cylindrical surfaces and extending outwardly of said intermediate member, said non-rotating pipes being in fluid flow communication with the open ends of said inner and outer pipes respectively, said terminal member having a cylindrical surface which, together with one said cylindrical surface of said intermediate member, are in closely spaced relation with the outer surface of said inner pipe and each terminates at a first radially outward extending surface, said first surfaces being opposed to and spaced apart from each other, the compressing member having a cylindrical surface which, together with the other cylindrical surface of said intermediate member, are in closely spaced relation with the outer surface of said outer pipe and each terminates at a second radially outward extending surface, said second surfaces being opposed to and spaced apart from each other, a pair of spaced apart annular packing glands, one said gland disposed between said opposed first surfaces and extending about the outer surface of said inner pipe, the other said annular packing gland disposed between said opposed second surfaces and extending about the outer surface of said outer pipe; and means for selectively varying the distance between said opposed first surfaces and between said opposed second surfaces, at least one of said non-rotating pipes being flexible and of sufficient length to permit movement in a direction parallel to the axis of said rotating pipes of the respective member from which said flexible member extends so that a selectively variable compressive force may be applied to both said glands causing variable radial expansion of said glands into engagement with said housing and the respective pipe about which said gland is mounted and so that the distance between said opposed first surfaces may be increased sufficiently to permit access to the gland disposed therebetween for the purpose of replacement thereof, said compressing member upon variation of the distance between said opposed second surfaces being freely movable in a direction parallel to the axis of said rotating pipes whereby access may be had to the gland disposed between said opposed second surfaces for the purpose of replacement thereof --and whereby the glands may be adjusted and replaced without disconnecting the pipes and while liquid is flowing through the pipes.

2. The rotary joint as claimed in claim 1 wherein said means for varying the distance between said opposed first surfaces includes: a pair of opposed flanges, one said flange extending outwardly from said terminal member and the other said flange extending outwardly from said intermediate member, each flange having a plurality of apertures formed therein, each aperture formed in one said flange being in registry with one said aperture in the other said flange; a bolt passing through each pair of 3. The rotary joint as claimed in claim 2 wherein said means for varying the distance between said opposed second surfaces include: a plurality of studs spaced about the outer wall of said intermediate member, a flange extending outwardly from said compressing member and having a plurality of apertures formed therein, said studs extending through said apertures and maintained therein by means of nuts threadably attached to each said stud, tightening of said nuts causing said compressing and intermediate members to move towards each other thereby decreasing the distance between said opposed second surfaces.

* * * * *